United States Patent
Hasegawa et al.

(10) Patent No.: US 7,518,961 B2
(45) Date of Patent: Apr. 14, 2009

(54) OPTICAL DISK RECORDING AND REPRODUCING APPARATUS FOR RECORDING AND REPRODUCING DATA IN AND FROM OPTICAL DISK

(75) Inventors: Hiroshi Hasegawa, Kanagawa (JP); Hiromichi Kobori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 525 days.

(21) Appl. No.: 11/370,408

(22) Filed: Mar. 8, 2006

(65) Prior Publication Data
US 2007/0070838 A1    Mar. 29, 2007

(30) Foreign Application Priority Data
Sep. 28, 2005    (JP)    ............... 2005-281981

(51) Int. Cl.
*G11B 7/00*    (2006.01)
(52) U.S. Cl. .................. 369/44.32; 369/53.19; 369/94; 369/44.29
(58) Field of Classification Search .............. 369/44.32, 369/53.19, 44.28, 44.29, 44.35, 94
See application file for complete search history.

(56) References Cited

U.S. PATENT DOCUMENTS

| | | | |
|---|---|---|---|
| 6,587,409 B1 * | 7/2003 | Yamazaki et al. | ........ 369/53.19 |
| 6,990,055 B1 * | 1/2006 | Nakamura et al. | ............ 369/94 |
| 7,215,606 B2 * | 5/2007 | Yonezawa | ................ 369/44.32 |
| 7,295,497 B2 * | 11/2007 | Iljima et al. | ............... 369/44.32 |
| 2005/0180277 A1 * | 8/2005 | Iljima et al. | ............... 369/44.32 |
| 2006/0002253 A1 * | 1/2006 | Ishihara | ................... 369/53.19 |

FOREIGN PATENT DOCUMENTS

| | | |
|---|---|---|
| JP | 10-064077 | 3/1998 |
| JP | 2000-339731 | 12/2000 |
| JP | 2001-052361 | 2/2001 |
| JP | 2001-236666 | 8/2001 |
| JP | 2001-266382 | 9/2001 |

OTHER PUBLICATIONS

Japanese Office Action dated Feb. 27, 2008 corresponding to U.S. Appl. No. 11/370,408, filed Mar. 8, 2006.
Japanese Office Action dated Oct. 24, 2008 corresponding to U.S. Appl. No. 11/370,408 filed on Mar. 8, 2006.

* cited by examiner

*Primary Examiner*—Thang V Tran
(74) *Attorney, Agent, or Firm*—Amin, Turocy & Calvin, LLP (57) ABSTRACT

An optical disk recording and reproducing apparatus includes a focus unit that focuses an irradiation light beam on an optical disk having data recording layers and tracks; a drive unit that changes a direction of the beam by moving the focus unit; a tilt control unit that detects a tilt amount of the optical disk, computes a control operation amount in a band wider than a rotation frequency of the optical disk based on the tilt amount, and controls the drive unit to move the focus unit based on the control operation amount. The tilt control unit holds a control state of the control at an immediate pre-state of an inter-layer jump in which the beam is moved to a different data recording layer or a track jump in which the beam is moved to a different track during the inter-layer jump or the track jump.

13 Claims, 9 Drawing Sheets

| TARGET RECORDING LAYER OF JUMP | TARGET RADIUS POSITION OF JUMP | HOLD CONTROL STATE |
|---|---|---|
| FIRST RECORDING LAYER | INNER PERIPHERAL PORTION | A |
| FIRST RECORDING LAYER | MIDDLE PERIPHERAL PORTION | B |
| ⋮ | ⋮ | ⋮ |
| SECOND RECORDING LAYER | OUTER PERIPHERAL PORTION | C |
|  |  |  |

OPTICAL DISK RECORDING AND REPRODUCING APPARATUS FOR RECORDING AND REPRODUCING DATA IN AND FROM OPTICAL DISK

CROSS-REFERENCE TO RELATED APPLICATIONS

This application is based upon and claims the benefit of priority from the prior Japanese Patent Application No. 2005-281981, filed on Sep. 28, 2005; the entire contents of which are incorporated herein by reference.

BACKGROUND OF THE INVENTION

1. Field of the Invention

The present invention relates to an optical disk recording and reproducing apparatus for recording and reproducing data in and from an optical disk.

2. Description of the Related Art

In the optical disk recording and reproducing apparatus in which data is recorded in an optical disk and the data recorded in the optical disk is reproduced, a laser beam is focused on a recording surface through a transparent substrate of the optical disk, and high-density data recording and reproduction of the data recorded in high density are realized by micro spots of the laser beam. However, generally warping and deformation exist in the optical disk, which generates a tilt from a normal line between an incident plane and a light beam incident for the recording or reproduction. When the spot is not sufficiently focused on the recording surface due to the disk tilt, reliability is decreased in the recording or reproduction.

A technology in which the decrease in reliability caused by the disk tilt is reduced in the recording or reproduction by performing tilt control is widely known. In the tilt control, a current disk tilt amount is detected to perform compensation according to the disk tilt amount. For example, Japanese Patent Application Laid-Open (JP-A) No. 2000-339731 proposes a technique in which influence of the disk tilt is compensated with an aberration correcting liquid crystal device provided in an optical path. However, in the method disclosed in JP-A No. 2000-339731, there are drawbacks that the liquid crystal device has a low response rate and conventionally the disk tilt amount cannot be detected at high speed.

Thus, a control band of the conventional tilt control method is extremely narrow, and generally static control is performed to an average value of the disk tilt. Accordingly, the control cannot be performed to the disk tilt dynamically changed according to disk rotation, and the reliability of the recording or reproduction is not sufficiently secured.

Therefore, for example, JP-A No. 2001-236666 proposes a technique in which the disk tilt is detected using an optical pickup having plural light beams. In the technique disclosed in JP-A No. 2001-236666, because the disk tilt can be detected in a broadband, broadband control can be performed not lower than a disk rotation frequency by using an objective lens actuator or the like in a tilt compensation unit, so that the reliability of the recording or reproduction can also be secured to the disk tilt dynamically changed according to the disk rotation.

On the other hand, an operation in which the laser spot is moved (jumped) between recording layers or between tracks in the same recording layer is generated during the data recording in the optical disk and the reproduction of the data recorded in the optical disk. During the inter-layer jump and the track jump, there is a possibility that disturbance is generated in a tilt error signal.

In the conventional static disk tilt control, the short-period disturbance has a little influence because the control band is narrow. For example, JP-A No. 2000-339731 proposes a technique in which servo run-away or the like caused by the influence of the disturbance is avoided by holding a tilt drive value during the inter-layer jump and the track jump. In the tilt control method disclosed in JP-A No. 2000-339731, the control band is originally narrow and the short-range track jump and the like are not a target of avoiding method.

However, when the dynamic disk tilt control is performed by the method disclosed in JP-A No. 2001-236666, because the tilt control band is broad, the tilt control follows the disturbance when the disturbance is generated in the tilt error signal during the jump even in the short-range jump. Therefore, the correct compensation is lost, which results in a problem that apparatus operation is destabilized such that the servo run-away is generated during the inter-layer jump and the track jump or abnormal recording and reproduction is generated immediately after the jump.

SUMMARY OF THE INVENTION

According to one aspect of the present invention, an optical disk recording and reproducing apparatus includes a focus unit that focuses an irradiation light beam on an optical disk having a plurality of data recording layers and a plurality of tracks; a drive unit that changes a direction of the irradiation light beam by moving the focus unit; a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit holding a control state of the control at an immediate pre-state of an inter-layer jump in which the irradiation light beam is moved to a different data recording layer or a track jump in which the irradiation light beam is moved to a different track during the inter-layer jump or the track jump.

According to another aspect of the present invention, an optical disk recording and reproducing apparatus includes a focus unit that focuses an irradiation light beam on an optical disk having a plurality of data recording layers and a plurality of tracks; a drive unit that changes a direction of the irradiation light beam by moving the focus unit; a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit holding a control state of the control at a predetermined hold control state during an inter-layer jump in which the irradiation light beam is moved to a different data recording layer or a track jump in which the irradiation light beam is moved to a different track.

According to still another aspect of the present invention, an optical disk recording and reproducing apparatus includes a focus unit that focuses an irradiation light beam on an optical disk having a plurality of data recording layers and a plurality of tracks; a drive unit that changes a direction of the irradiation light beam by moving the focus unit; a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit decreasing a control gain of the tilt control unit or narrowing a control band of the tilt control unit during an inter-layer jump in which the irradiation light beam is moved to a different data recording layer or a track jump in which the irradiation light beam is moved to a different track.

DETAILED DESCRIPTION OF THE INVENTION

An optical disk recording and reproducing apparatus according to a first embodiment holds a value of the tilt error signal at an immediately preceding value of the inter-layer jump or track jump during periods of the inter-layer jump and the track jump while performing the tilt control in the broadband not lower than the disk rotation frequency.

Figure 1:
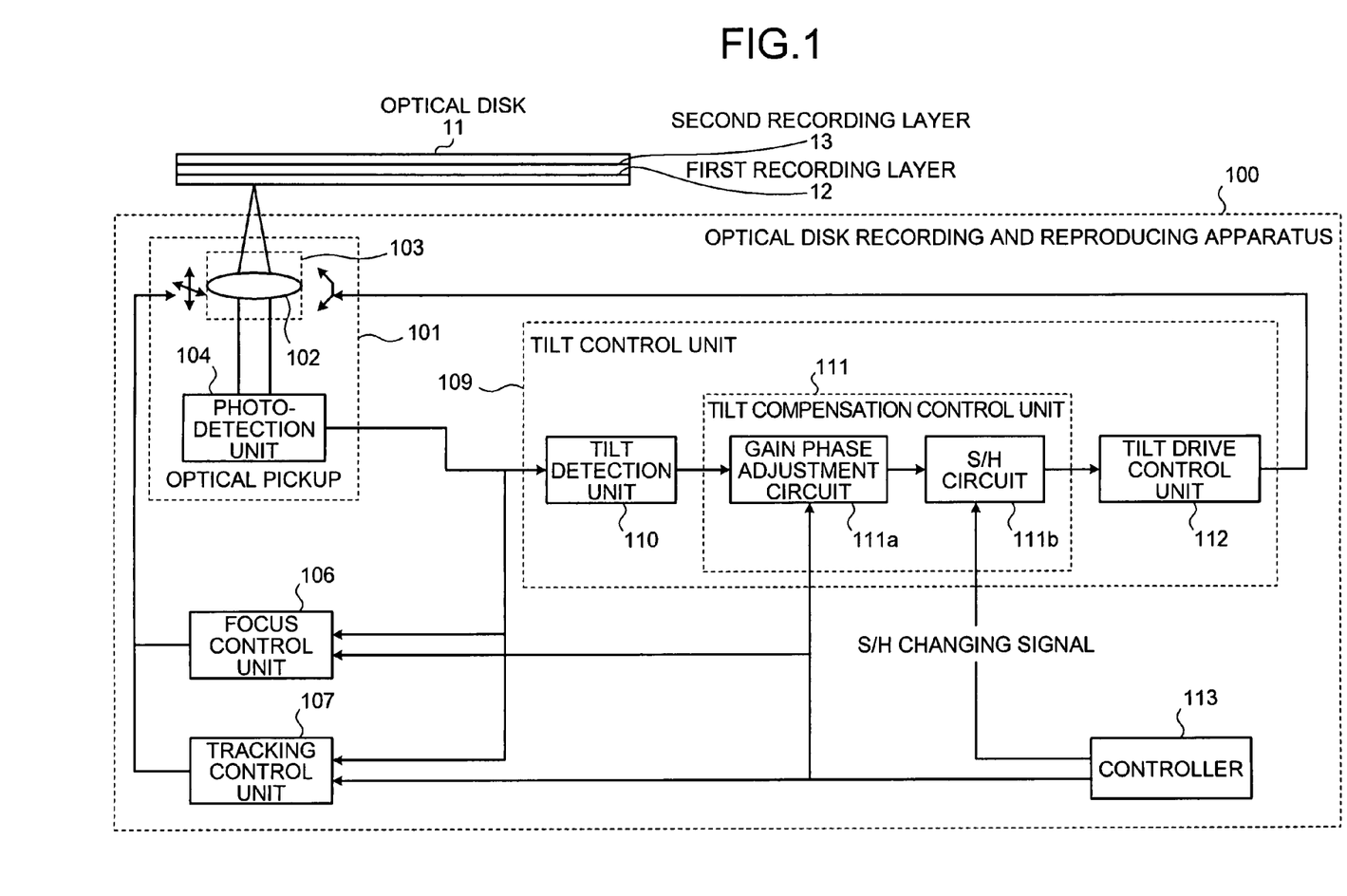
FIG. 1 is a block diagram showing a configuration of an optical disk recording and reproducing apparatus according to a first embodiment.

FIG. 1 is a block diagram showing a configuration of an optical disk recording and reproducing apparatus 100 according to the first embodiment. Referring to FIG. 1, the optical disk recording and reproducing apparatus 100 includes an optical pickup 101, a focus control unit 106, a tracking control unit 107, a tilt control unit 109, and a controller 113.

In the optical disk recording and reproducing apparatus 100, an optical disk 11 is irradiated with a laser beam, and the laser beam is focused on a target data recording layer and a target track position to perform the data recording and the reproduction of the recorded data. The optical disk 11 is a single-sided two-layer type optical disk having a first recording layer 12 and a second recording layer 13.

The optical pickup 101 includes an objective lens 102, an objective lens actuator 103, and a photo-detection unit 104 having a quadrant photodetector and the like. The optical pickup 101 also includes a light-emitting device which is of a laser beam source, a beam splitter (not shown), and the like.

The objective lens 102 faces the optical disk 11 to focus the laser beam on the first recording layer 12 and second recording layer 13 of the optical disk 11. The laser beam focused by the objective lens 102 forms the beam spot on the optical disk 11, which enables the data to be recorded and reproduced.

The objective lens actuator 103 is configured to drive the objective lens 102 in three axial directions, and the objective lens actuator 102 moves or inclines the objective lens 102 so that a quality level of the optical spot focused by the objective lens 102 is increased. Thus, the objective lens actuator 103 can drive the objective lens 102 not only in a focus direction and a tracking direction but in a tilt direction. Driving the objective lens actuator 103 in the tilt direction allows changes in the direction of the irradiation light beam and thus the tilt control.

The photo-detection unit 104 receives the laser beam reflected from the optical disk 11, and the photo-detection unit 104 performs photoelectric conversion of the laser beam to output an electric signal. The focus control unit 106 can detect a focus position error signal from the signal output from the photo-detection unit 104, and the focus position error signal indicates focus displacement with respect to the data recording surface. The tracking control unit 107 can detect a track position error signal from the signal output from the photo-detection unit 104, and the track position error signal indicates position displacement of the optical spot in a disk radial direction with respect to the target track or the target data pit. The tilt control unit 109 can detect the tilt error signal from the signal output from the photo-detection unit 104, and the tilt error signal indicates tilt shift of the disk surface with respect to an optical axis of the objective lens 102.

In the first embodiment, the optical pickup 101 can detect not only the usual focus position error and track position error but the disk tilt error in the broadband using the method disclosed in JP-A No. 2001-236666.

The focus control unit 106 computes the focus position error signal from the signal output from the photo-detection unit 104, and the focus control unit 106 drives the objective lens actuator 103 in the focus direction to perform the focus control based on the focus position error signal.

The tracking control unit 107 computes the track position error signal from the signal output from the photo-detection unit 104, and the tracking control unit 107 drives the objective lens actuator 103 in the tracking direction to perform the tracking control based on the track position error signal.

The tilt control unit 109 computes the tilt error signal from the signal output from the photo-detection unit 104, and the tilt control unit 109 drives the objective lens actuator 103 in the disk tilt direction to perform the tilt control in the broadband based on the tilt error signal. The tilt. control unit 109 includes a tilt detection unit 110, a tilt compensation control unit 111, and a tilt drive control unit 112.

The tilt detection unit 110 detects the tilt error signal in the broadband from the signal output from the photo-detection unit 104. The tilt error signal indicates a tilt amount of the optical disk 11. For example, the method disclosed in JP-A No. 2001-236666, which is incorporated herein by reference, in which the disk tilt is detected based on phase displacement between the track error signals detected from a main beam and a sub-beam, can be applied to the tilt detection unit 110. In the invention, the tilt detection method is not limited to the method disclosed in JP-A No. 2001-236666, but any method can be applied as long as the method can detect the disk tilt in the broadband including the disk tilt dynamically changed in association with the disk rotation.

On the basis of the tilt error signal detected by the tilt detection unit 110, the tilt compensation control unit 111 computes a control operation amount for performing tilt control of the objective lens actuator 103.

The tilt compensation control unit 111 holds a control state in performing the tilt control of the objective lens actuator 103 at the immediately preceding state of the inter-layer jump or track jump while the inter-layer jump in which the irradiation light beam is moved to the different layer and the track jump in which the irradiation light beam is moved to the different track are performed. Therefore, the servo run-away can be avoided to stabilize the apparatus operation during the jump.

The tilt compensation control unit 111 includes a gain phase adjustment circuit 111a and an S/H (Sample/Hold) circuit 111b.

The gain phase adjustment circuit 111a adjusts a gain and a phase of the tilt error signal detected by the tilt detection unit 110.

The S/H circuit 111b passes (samples) or holds the tilt error signal to which the gain and the phase are adjusted by the gain phase adjustment circuit 111a, according to an S/H changing signal input from the controller 113.

Specifically the S/H circuit 111b passes the tilt error signal output from the gain phase adjustment circuit 111a during the usual tracking operation, and the S/H circuit 111b holds an immediately preceding signal level of the jump during the inter-layer jump and track jump. In resuming the tracking operation after the jump, the S/H circuit 111b passes the tilt error signal output from the gain phase adjustment circuit 111a again.

The signal to be held is not limited to the tilt error signal to which the gain and the phase are adjusted, but any signal can be covered as long as the signal keeps a control state when the tilt control is performed to objective lens actuator 103. For example, it is possible to be configured to hold the pre-gain and phase adjustment tilt error signal output from the tilt detection unit 110.

The tilt drive control unit 112 performs the tilt control of the objective lens actuator 103 according to the control operation amount output from the tilt compensation control unit 111.

The controller 113 controls operation states of the focus control unit 106, the tracking control unit 107, and the tilt control unit 109. The inter-layer jump and the track jump are also performed by a command from the controller 113. In the tilt control unit 109, the command from the controller 113 is input to the tilt compensation control unit 111. The controller 113 inputs the S/H changing signal to the S/H circuit 111b.

Figure 2:
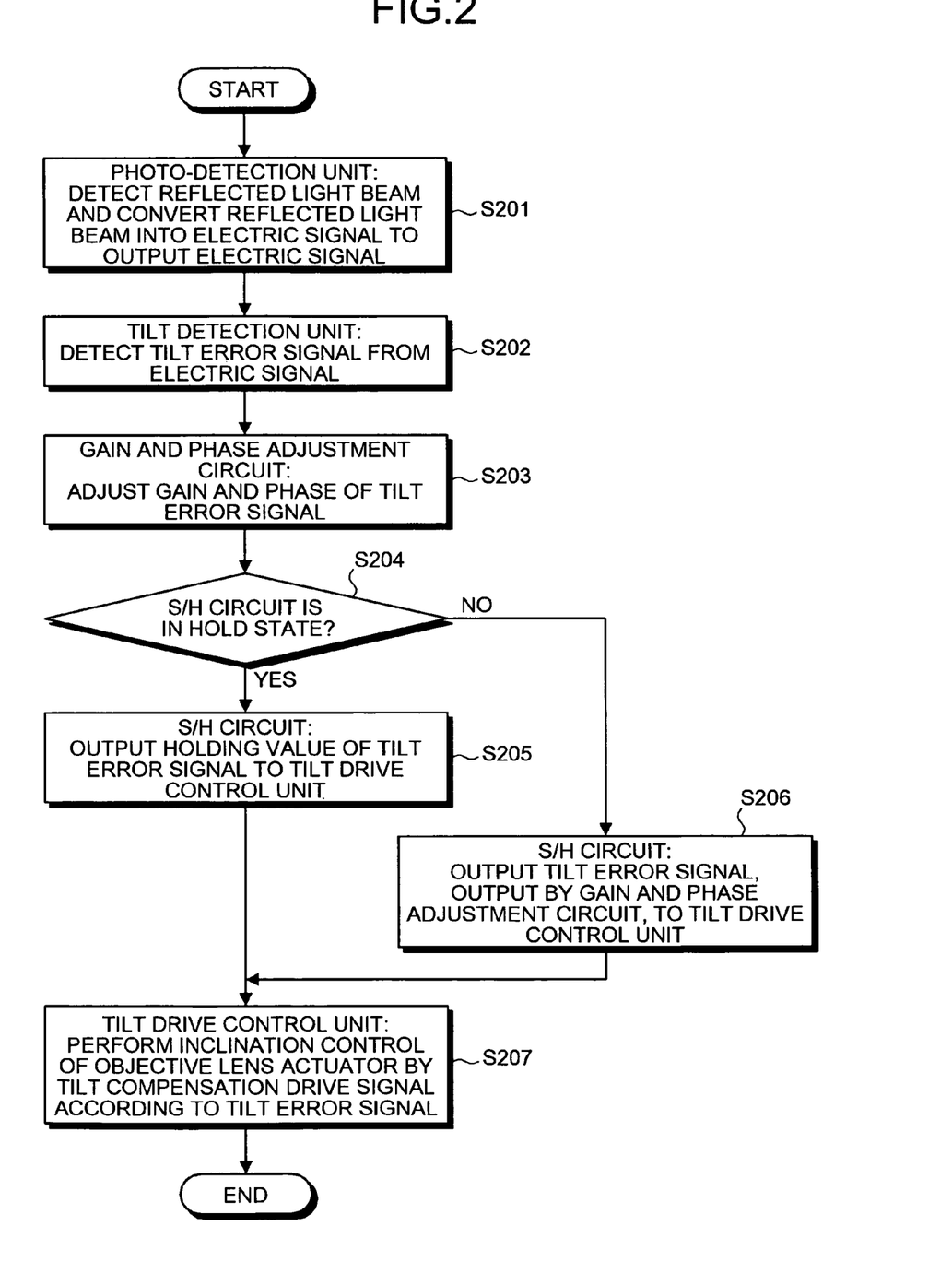
FIG. 2 is a flowchart showing an entire flow of a tilt control process in the first embodiment.

A tilt control process performed by the optical disk recording and reproducing apparatus 100 of the first embodiment having the above-described configuration will be described below. FIG. 2 is a flowchart showing an entire flow of the tilt control process in the first embodiment.

First the photo-detection unit 104 receives the laser beam reflected from the optical disk 11, and the photo-detection unit 104 performs the photoelectric conversion of the laser beam to output the electric signal (Step S201). The tilt detection unit 110 detects the tilt error signal from the electric signal output by the photo-detection unit 104 (Step S202). As described above, the detection of the tilt error signal performed by the method disclosed in JP-A No. 2001-236666 in which the disk tilt can be detected in the broadband.

The gain phase adjustment circuit 111a included in the tilt compensation control unit 111 adjusts the gain and the phase of the tilt error signal detected by the tilt detection unit 110 (Step S203).

Then, the signal value output to the tilt drive control unit 112 is changed according to the state of the S/H circuit 111b, i.e., the hold state or the sampling state (Step S204). When the S/H circuit 111b is in the hold state (Yes in Step S204), the S/H circuit 111b outputs the holding value of the tilt error signal to the tilt drive control unit 112 (Step S205).

Then, the S/H changing signal input from the controller 113 changes the hold state and the sampling state. Specifically, in starting the inter-layer jump or the track jump, the controller 113 receives the S/H changing signal to the hold state. After the inter-layer jump or the track jump is finished, the S/H changing signal to the sampling state is input from the controller 113.

When the S/H circuit 111b is not in the hold state, i.e., when the S/H circuit 111b is in the sampling state (No in Step S204), the S/H circuit 111b directly outputs the value of the tilt error signal, output by the gain phase adjustment circuit 111a, to the tilt drive control unit 112 (Step S206).

Even if the disturbance is generated in the tilt error signal by the changing process during the jump, the tilt control never follows the disturbance. For the short-range jump in the track hold operation and the like, because the disk tilt in jump and the disk tilt of the immediate post-jump are substantially equal to the disk tilt of the immediate pre-jump, the servo run-way can be prevented in the jump and the recording and the reproduction can normally be performed immediately after the jump.

Finally the tilt drive control unit 112 performs the tilt control of the objective lens actuator 103 with the drive signal for the tilt control according to the tilt error signal (Step S207).

Thus, in the optical disk recording and reproducing apparatus of the first embodiment, the control state of the tilt control can be held at the immediate preceding state of the inter-layer jump or the track jump during the periods of the inter-layer jump and the track jump. Therefore, the tilt error signal disturbance generated by the jump is not followed, and the servo run-away and the destabilization of the recording or reproducing process are avoided immediately after the jump, so that the tilt control can be performed in the broadband not lower than the disk rotation frequency without losing the apparatus operation stability.

An optical disk recording and reproducing apparatus according to a second embodiment sets the tilt error signal value at a predetermined reference value during the periods of the inter-layer jump and the track jump.

Figure 3:
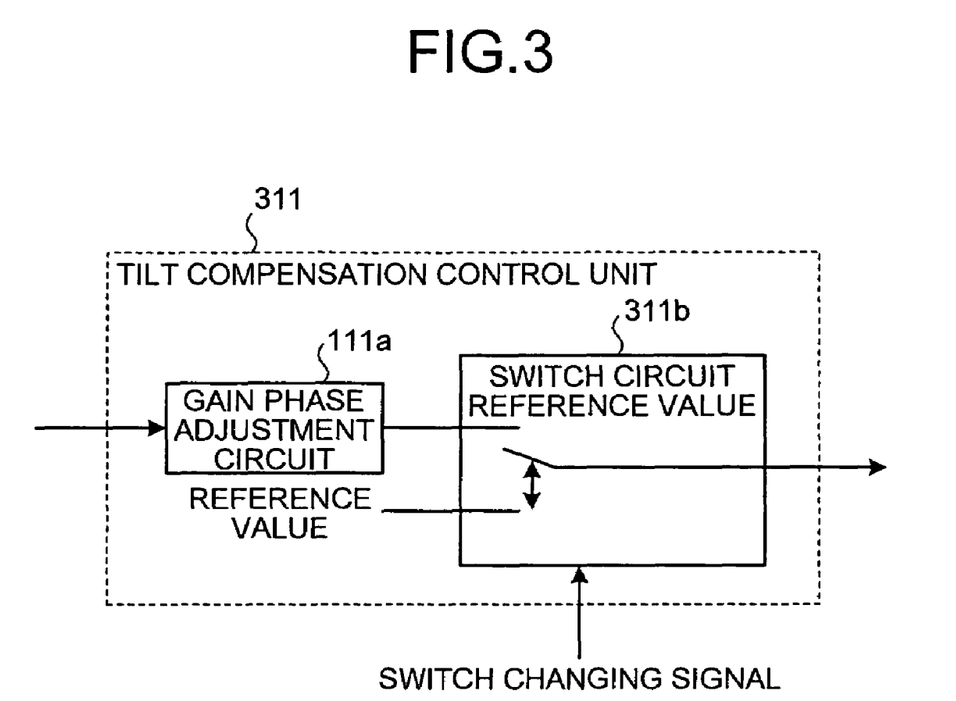
FIG. 3 is a block diagram showing a detailed configuration of a tilt compensation control unit according to a second embodiment.

FIG. 3 is a block diagram showing a detailed configuration of a tilt compensation control unit 311 according to the second embodiment. Referring to FIG. 3, the tilt compensation control unit 311 of the second embodiment includes the gain phase adjustment circuit 111a and a switch circuit 311b.

The second embodiment differs from the first embodiment in that a switch circuit 311b is added instead of the S/H circuit 111b. Because the configuration and function of the gain phase adjustment circuit 111a are similar to the first embodiment, the same component is designated by the same numeral and the description of the same component will be not repeated.

The switch circuit 311b changes the signal output to the tilt drive control unit 112 between the tilt error signal output by the gain phase adjustment circuit 111a and the predetermined reference value which is of a fixed potential according to a switch changing signal input from the controller 113.

Specifically, the switch circuit 311b is connected to the gain phase adjustment circuit 111a in the usual tracking operation, and the switch circuit 311b is connected to the reference value in the inter-layer jump and the track jump. In the resuming the tracking operation after the jump, the switch circuit 311b changes the connection to the gain phase adjustment circuit 111a again. For example, the value in which the tilt control is not performed, i.e., the value in which the tilt direction of the objective lens actuator 103 becomes the center is set at the reference value.

Figure 4:
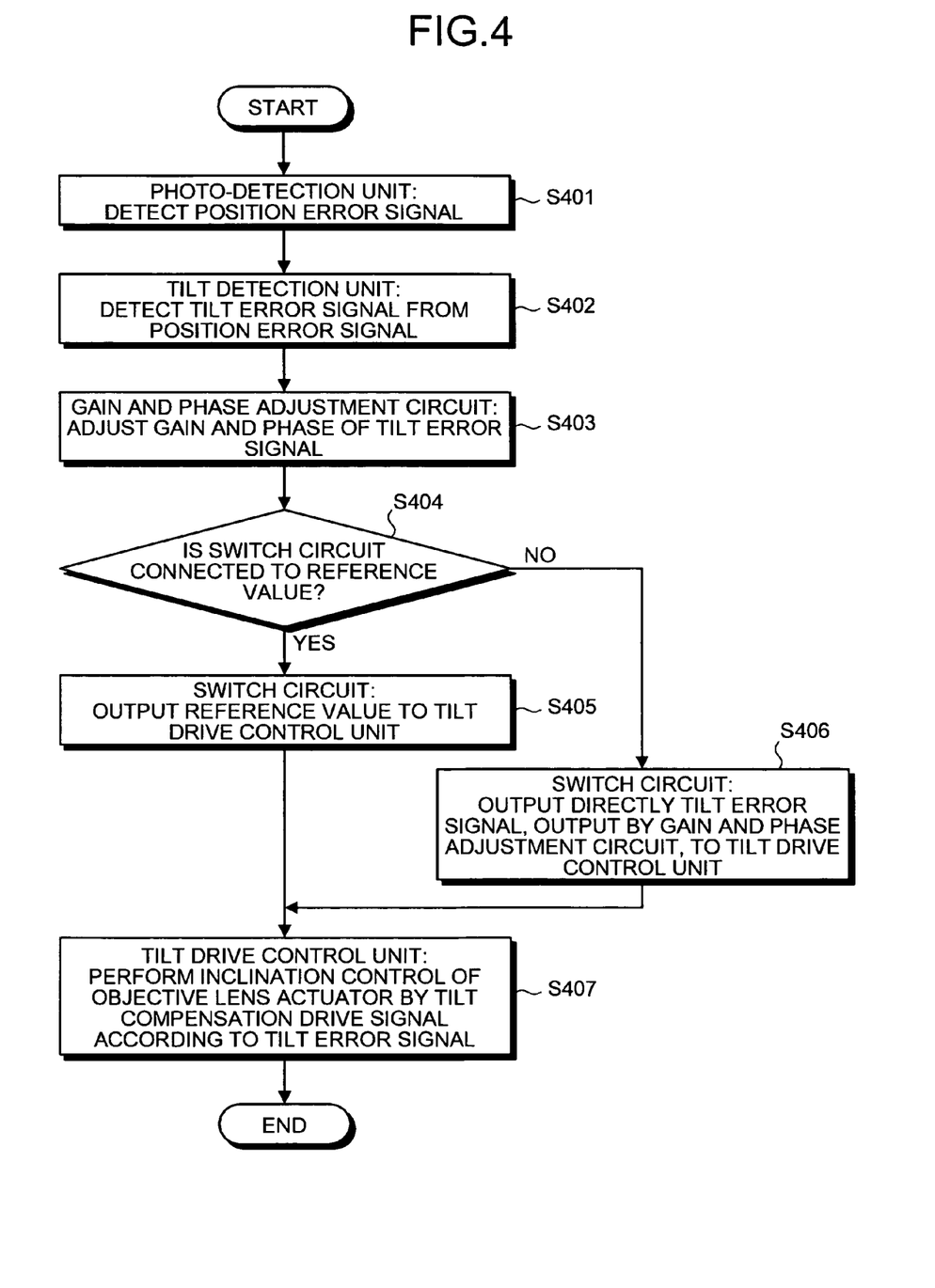
FIG. 4 is a flowchart showing an entire flow of a tilt control process in the second embodiment.

A tilt control process performed by the optical disk recording and reproducing apparatus of the second embodiment having the above-described configuration will be described below. FIG. 4 is a flowchart showing the entire flow of the tilt control process in the second embodiment.

The tilt signal detection process and the gain and phase adjustment process from Step S401 to Step S403 are similar to Step S201 to Step S203 in the optical disk recording and reproducing apparatus 100 of the first embodiment, so that the description will be not repeated.

After the gain phase adjustment circuit 111a adjusts the gain and phase of the tilt error signal in Step S403, the value of the signal output to the tilt drive control unit 112 is changed according to the connection of the switch circuit 311b to the reference value or to the gain phase adjustment circuit 111a (Step S404). When the switch circuit 311b is connected to the reference value (Yes in Step S404), the switch circuit 311b outputs the reference value to the tilt drive control unit 112 (Step S405).

The switch changing signal input from the controller 113 changes the connection of the switch circuit 311b. Specifically, in starting the inter-layer jump or the track jump, the controller 113 inputs the changing signal for changing the connection to the reference value. After the inter-layer jump or the track jump is finished, the controller 113 inputs the changing signal for changing the connection to the gain phase adjustment circuit 111a.

When the switch circuit 311b is not connected to the reference value, i.e., when the switch circuit 311b is connected to the gain phase adjustment circuit 111a (No in Step S404), the switch circuit 311b directly outputs the value of the tilt error signal, output by the gain phase adjustment circuit 111a, to the tilt drive control unit 112 (Step S406).

Even if the disturbance is generated in the tilt error signal by the switch change during the jump, the tilt control never follows the disturbance. In the first embodiment, since the immediately preceding signal level is held during the jump, the signal level is held not to normally perform the recording and the reproduction immediately after the jump, for example, when the disk tilt states before and after the jump are different from each other due to the relatively long-range jump, or when the disturbance is superposed on the tilt detection signal of the immediate pre-jump.

On the other hand, in the second embodiment, the tilt direction of the objective lens actuator 103 in jump is set at the reference value irrespective of the signal level of the immediate pre-jump, and the tilt control is also started from the reference value immediately after the jump, so that the problem in the first embodiment can be avoided.

Since the switch circuit 311b can be formed by the simple circuit compared with the S/H circuit 111b, the stable tilt control can be realized at low cost.

Because the objective lens drive process in Step S407 is similar to Step S207 in the optical disk recording and reproducing apparatus 100 of the first embodiment, the description will be not repeated.

Thus, in the optical disk recording and reproducing apparatus of the second embodiment, the control state can be held at the predetermined reference state during the periods of the inter-layer jump and the track jump. Therefore, the circuit configuration can be simplified and the tilt control can be performed in the broadband not lower than the disk rotation frequency without losing the apparatus operation stability.

A optical disk recording and reproducing apparatus according to a third embodiment sets the tilt error signal value at a predetermined value stored in a storage unit during the periods of the inter-layer jump and the track jump.

Figure 5:
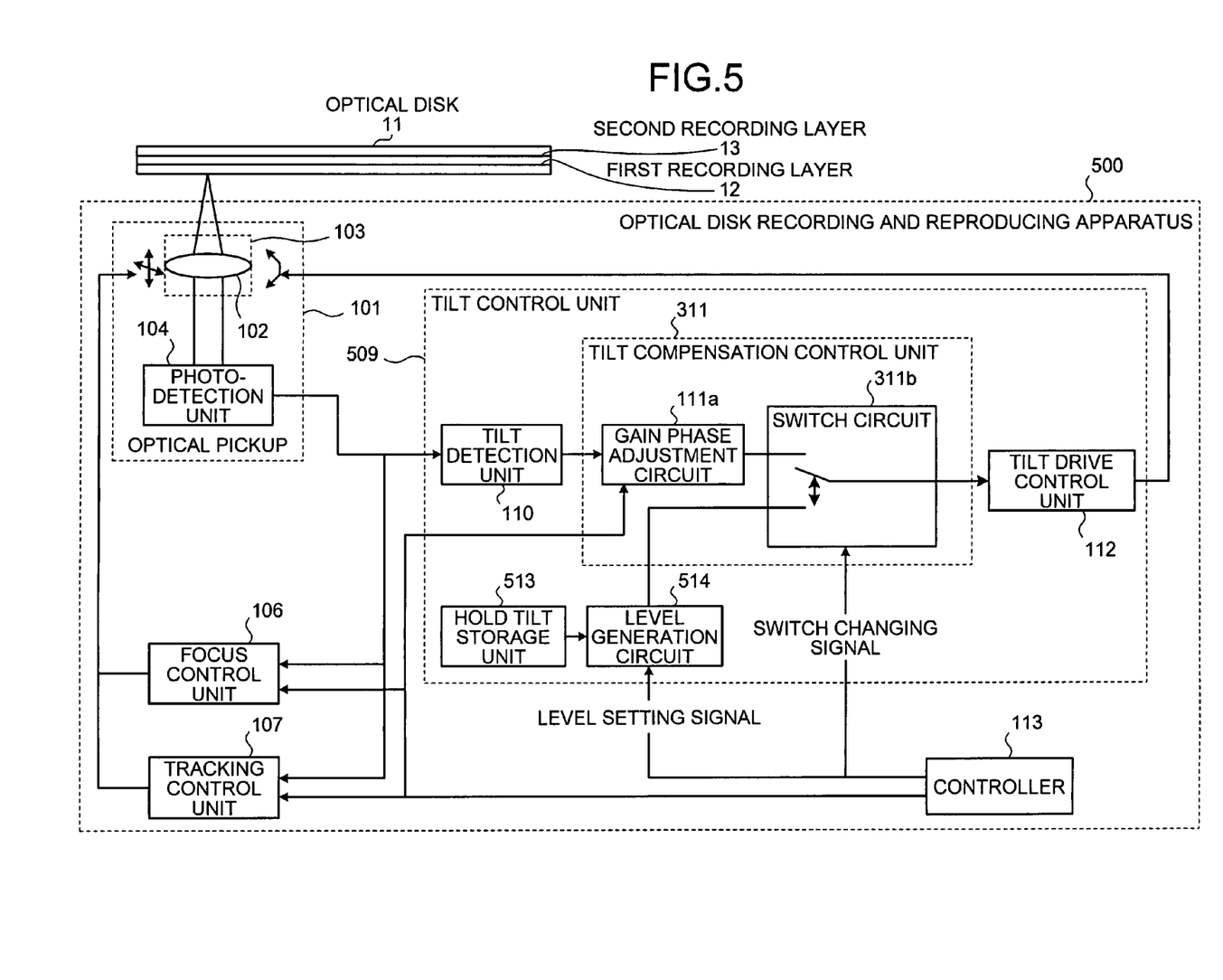
FIG. 5 is a block diagram showing a detailed configuration of a tilt compensation control unit according to a third embodiment.

FIG. 5 is a block diagram showing a detailed configuration of an optical disk recording and reproducing apparatus 500 according to the third embodiment. Referring to FIG. 5, the optical disk recording and reproducing apparatus 500 of the third embodiment includes the optical pickup 101, the focus control unit 106, the tracking control unit 107, a tilt control unit 509, and the controller 113.

The tilt control unit 509 includes the tilt detection unit 110, the tilt compensation control unit 311, the tilt drive control unit 112, a hold tilt storage unit 513, and a level generation circuit 514.

The third embodiment differs from the second embodiment in that a hold tilt storage unit 513 and a level generation circuit 514 are added. Because the other configurations and functions are similar to the second embodiment, the same component is designated by the same numeral and the description of the same component will be not repeated.

The target data recording layer of jump or a target track radius position of jump and a hold control state are stored in the hold tilt storage unit 513 while associated with each other. The hold control state is the control state held during the jump, and the hold control state becomes an initial state of the control when the tilt control is started after the jump. The track radius position shall mean information for indicating which position the track exists in the radial direction of the optical disk.

For example, when the optical disk is divided into three regions of an inner peripheral portion, a middle peripheral portion, and an outer peripheral portion, the radius position exists in any one of the inner peripheral portion, the middle peripheral portion, and the outer peripheral portion. The radius position is not limited to the above example, but any piece information can be used as the radius position as long as the information indicates which position the track exists in the radial direction of the optical disk.

A value learned in performing the tilt control to the optical disk 11 in which the recording or the reproduction is currently performed is stored as the hold control state in the hold tilt storage unit 513. Alternately, the learned value may be simultaneously recorded in a read-in area of the optical disk 11 in recording the data in to the optical disk 11, and the recorded value may be read in the reproduction to store the value in the hold tilt storage unit 513.

Figure 6:
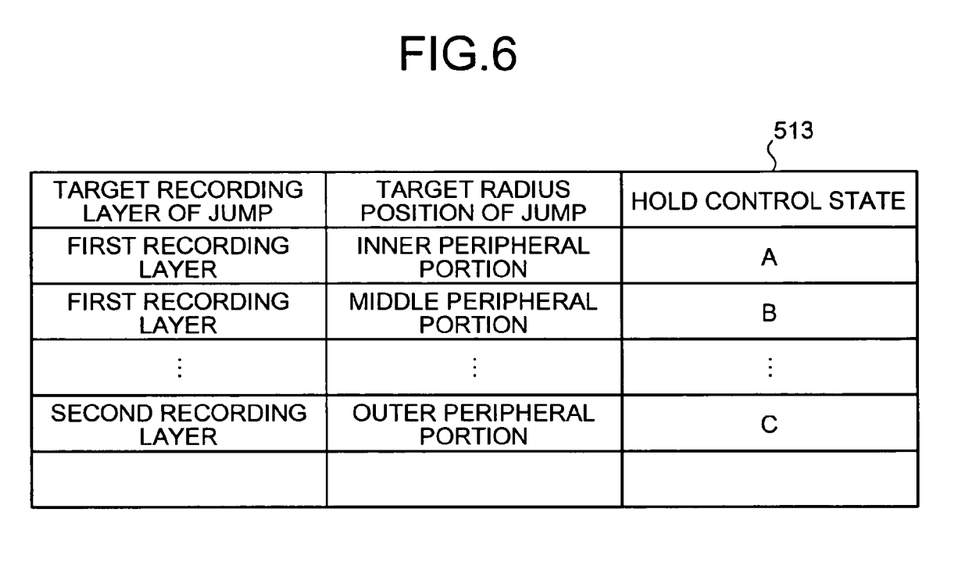
FIG. 6 is an explanatory view showing an example of a data structure of an initial tilt storage unit.

FIG. 6 is an explanatory view showing an example of a data structure of the initial tilt storage unit 513. As shown in FIG. 6, the target recording layer of jump, the target radius position of jump, and the hold control state are stored in the hold tilt storage unit 513 while associated with one another. Specifically the hold control state is the tilt error signal value held during the jump, and the tilt error signal value used in starting the tilt control at the target radius position of jump of the target recording layer of jump is stored as the hold control state.

Incidentally, it is also possible that only the target recording layer of jump and the hold control state are stored while associated with each other, or it is also possible that only the target radius position of jump and the hold control state are stored while associated with each other.

According to a level setting signal input from the controller 113, the level generation circuit 514 obtains the hold control state corresponding to the target information recording layer of jump or the radius position where the target track of jump exists from the hold tilt storage unit 513. The level generation circuit 514 generates the fixed potential corresponding to the obtained hold control state to impart the fixed potential to the switch circuit 311b.

Figure 7:
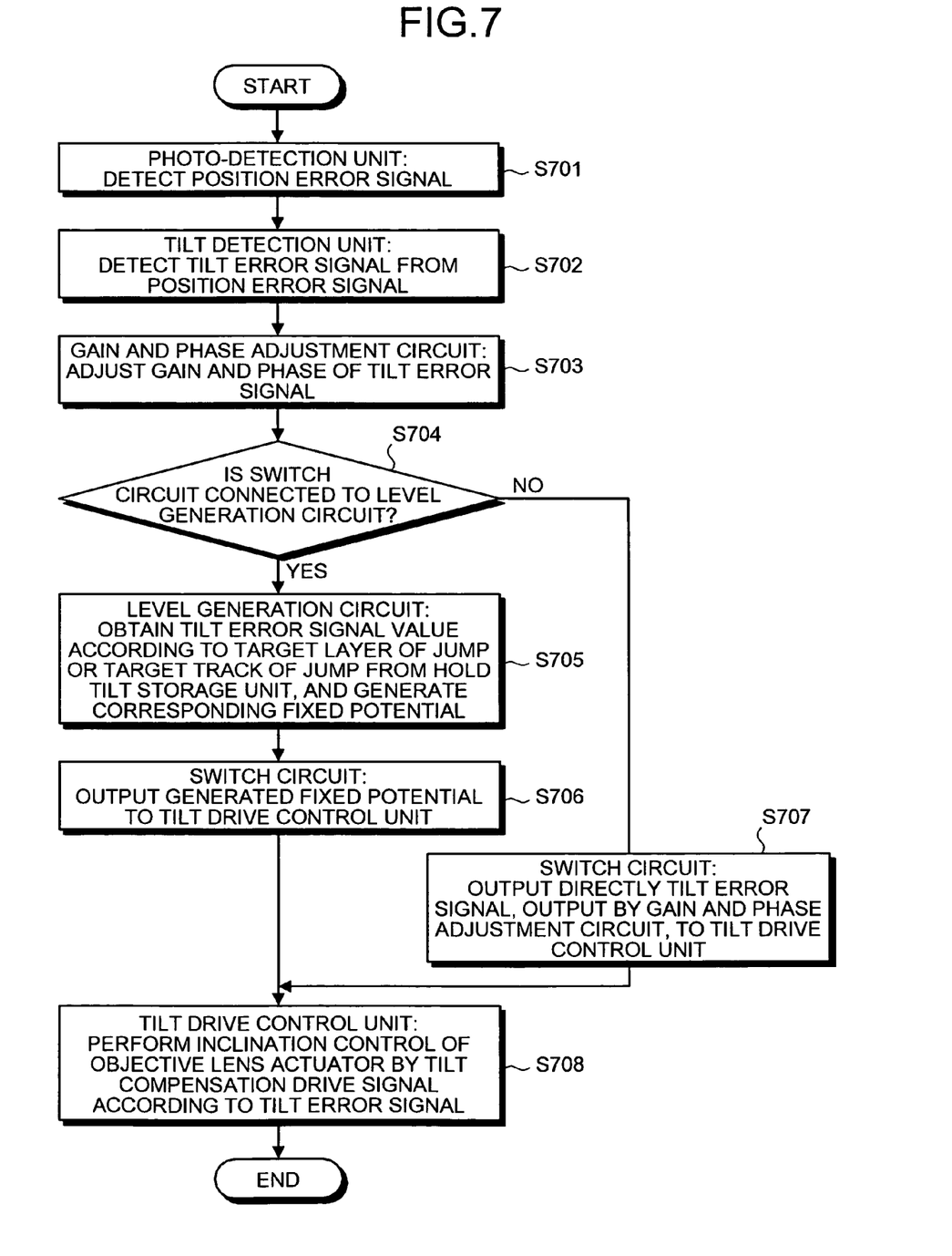
FIG. 7 is a flowchart showing an entire flow of a tilt control process in the third embodiment.

A tilt control process performed by the optical disk recording and reproducing apparatus 500 of the third embodiment having the above-described configuration will be described below. FIG. 7 is a flowchart showing the entire flow of the tilt control process in the third embodiment.

The tilt signal detection process and the gain and phase adjustment process from Step S701 to Step S703 are similar to Step S401 to Step S403 in the optical disk recording and reproducing apparatus of the second embodiment, so that the description will be not repeated.

After the gain phase adjustment circuit 111a adjusts the gain and phase of the tilt error signal in Step S703, the value of the signal output to the tilt drive control unit 112 is changed according to the connection of the switch circuit 311b to the level generation circuit 514 or to the gain phase adjustment circuit 111a (Step S704). When the switch circuit 311b is connected to the level generation circuit 514 (Yes in Step S704), the level generation circuit 514 obtains the tilt error signal value corresponding to the target information recording layer of jump or the target track of jump from the hold tilt storage unit 513, and the level generation circuit 514 generates the fixed potential corresponding to the obtained value (Step S705).

Then, the switch circuit 311b outputs the fixed potential, generated by the level generation circuit 514, to the tilt drive control unit 112 (Step S706).

The switch changing signal input from the controller 113 changes the connection of the switch circuit 311b. Specifically, in starting the inter-layer jump or the track jump, the controller 113 inputs the changing signal for changing the connection to the level generation circuit 514. After the inter-layer jump or the track jump is finished, the controller 113 inputs the changing signal for changing the connection to the gain phase adjustment circuit 111a.

When the switch circuit 311b is not connected to the level generation circuit 514, i.e., when the switch circuit 311b is connected to the gain phase adjustment circuit 111a (No in Step S704), the switch circuit 311b directly outputs the value of the tilt error signal, output by the gain phase adjustment circuit 111a, to the tilt drive control unit 112 (Step S707).

Because the objective lens drive process in Step S708 is similar to Step S407 in the optical disk recording and reproducing apparatus of the second embodiment, the description will be not repeated.

Thus, in the optical disk recording and reproducing apparatus of the third embodiment, the control state is held at the predetermined state which is stored in the storage unit corresponding to the target information recording layer of jump or the target track of jump during the periods of the inter-layer jump and the track jump. Therefore, the correct tilt control according to the target of the jump can be realized, and the stability improvement of the post-jump recording and reproduction can be realized.

During the periods of the inter-layer jump and the track jump, an optical disk recording and reproducing apparatus according to a fourth embodiment decreases the gain of the tilt control or changes the gain to a phase characteristic which becomes a narrow band.

Figure 8:
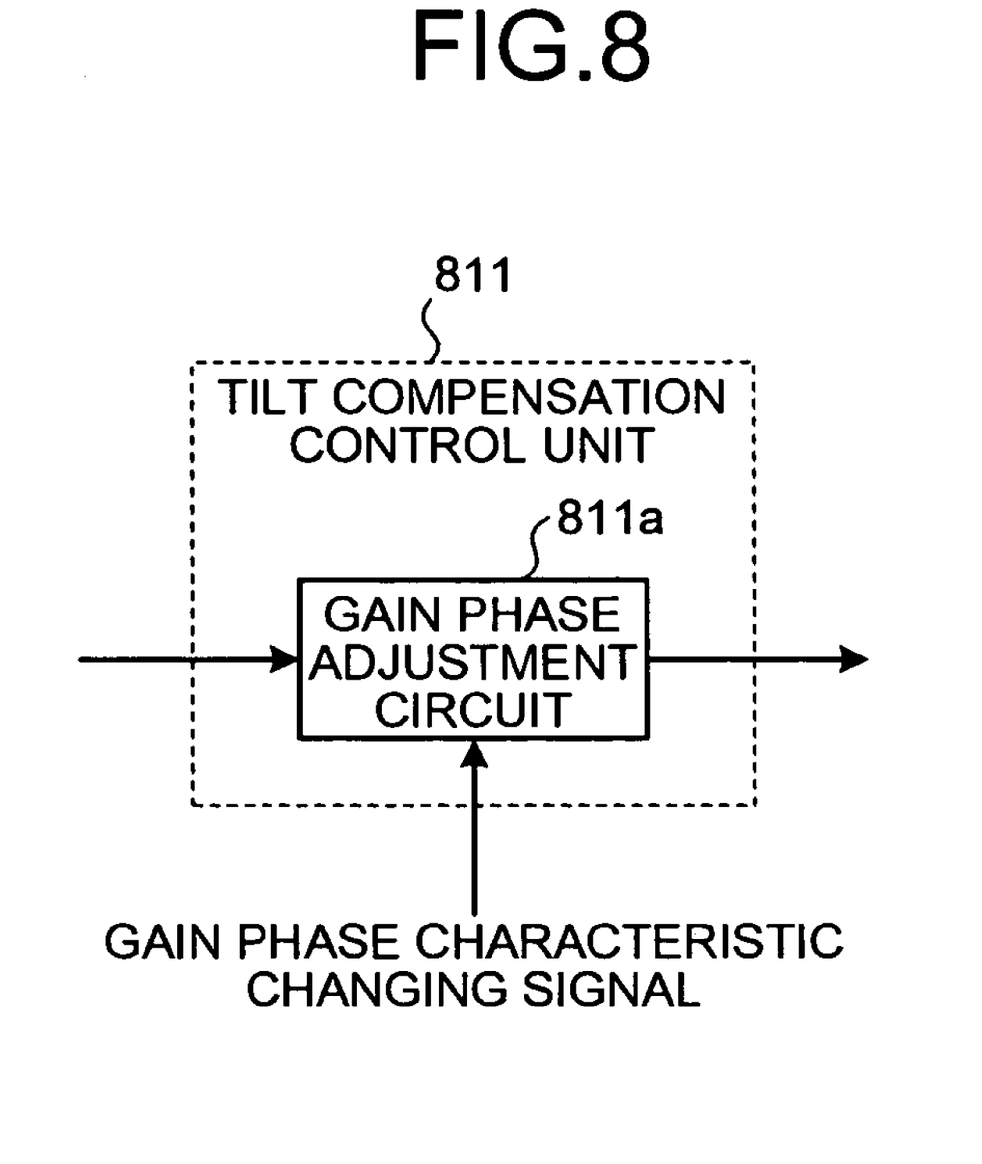
FIG. 8 is a block diagram showing a detailed configuration of a tilt compensation control unit according to a fourth embodiment.

FIG. 8 is a block diagram showing a detailed configuration of a tilt compensation control unit 811 according to the fourth embodiment. Referring to FIG. 8, the tilt compensation control unit 811 of the fourth embodiment includes a gain phase adjustment circuit 811a.

The fourth embodiment differs from the first embodiment in elimination of the S/H circuit 111b is eliminated and the function of a gain phase adjustment circuit 811a.

The gain phase adjustment circuit 811a changes a gain phase characteristic of the tilt error signal, input from the tilt detection unit 110, according to a gain phase characteristic changing signal input from the controller 113. In the fourth embodiment, the gain phase adjustment circuit 811a is directly connected to the tilt drive control unit 112, and the signal output from the gain phase adjustment circuit 811a is directly input to the tilt drive control unit 112.

In the gain phase adjustment circuit 811a, while the usual gain phase characteristic is set in the usual tracking operation, the usual gain phase characteristic is changed to the low-gain or narrow-band gain phase characteristic in the inter-layer jump and the track jump. In resuming the tracking operation after the jump, the gain phase adjustment circuit 811a returns the low-gain or narrow-band gain phase characteristic to the usual gain phase characteristics.

Figure 9:
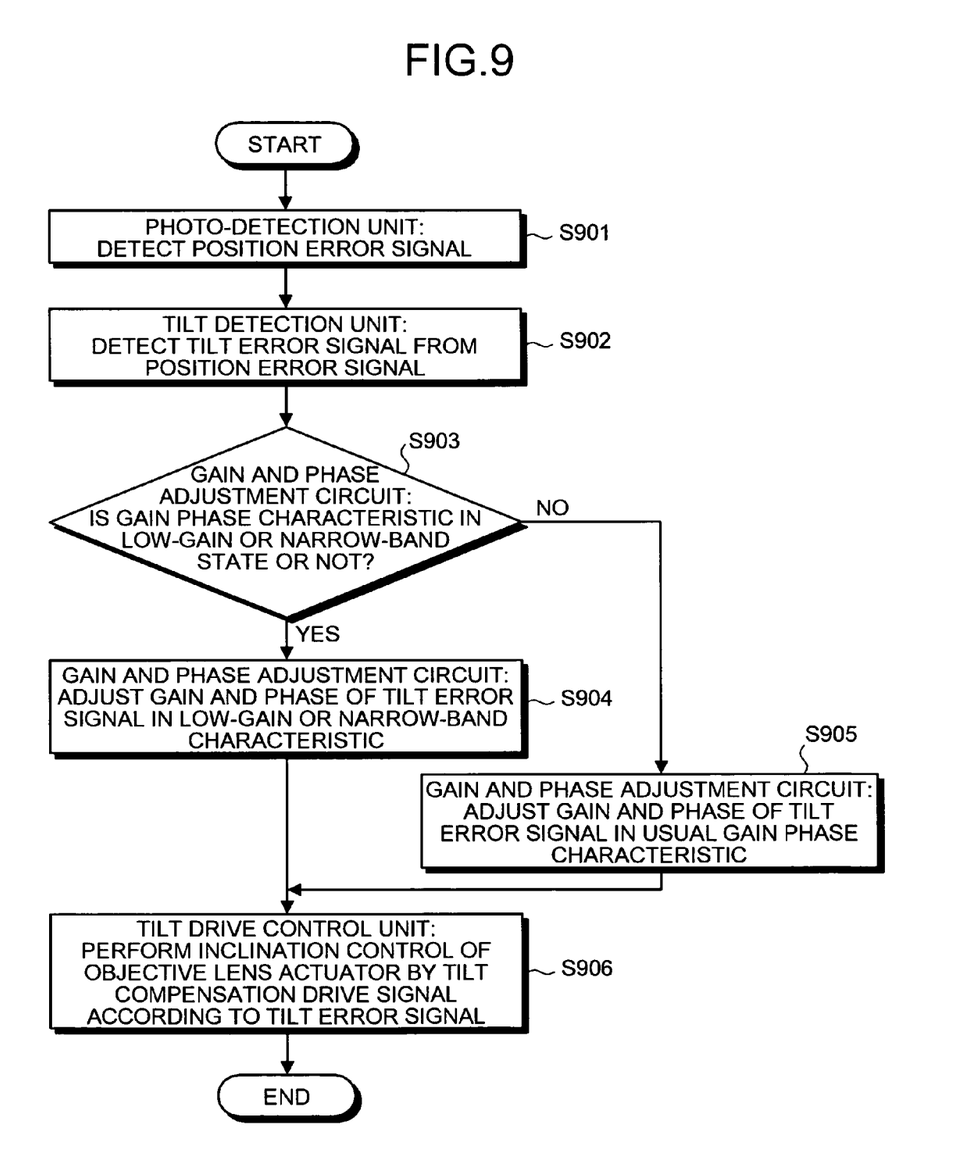
FIG. 9 is a flowchart showing an entire flow of a tilt control process in the fourth embodiment.

A tilt control process performed by the optical disk recording and reproducing apparatus of the fourth embodiment having the above-described configuration will be described below. FIG. 9 is a flowchart showing the entire flow of the tilt control process in the fourth embodiment.

The tilt signal detection process in Step S901 and Step S902 is similar to Step S201 and Step S202 in the optical disk recording and reproducing apparatus 100 of the first embodiment, so that the description will be not repeated.

After the tilt detection unit 110 detects the tilt error signal in Step S902, the gain phase adjustment circuit 811a determines whether the gain phase characteristic is in the low-gain or narrow-band state or not (Step S903).

The gain phase characteristic is changed by the gain phase characteristic changing signal input from the controller 113. Specifically, in starting the inter-layer jump or the track jump, the controller 113 inputs the changing signal for changing the gain phase characteristic to the low-gain state or the narrow-band state. After the inter-layer jump or the track jump is finished, the controller 113 inputs the changing signal for changing the gain phase characteristics to the usual state.

When the gain phase characteristic is in the low-gain state or the narrow-band state (Yes in Step S903), the gain phase adjustment circuit 811a adjusts the gain and the phase of the tilt error signal in the low-gain or narrow-band characteristic to outputs the tilt error signal to the tilt drive control unit (Step S904).

Thus, the tilt control is decreased in the jump because of the low gain or the narrow band, and the tilt control hardly follows the disturbance even if the short-time disturbance is generated in the tilt error signal. On the other hand, because the tilt control is continued in itself, the tilt control follows the disk tilt state to some extent, for example, when the disk tilt state is changed in the relatively long-range jump. Accordingly, the servo-run-away can be suppressed in the jump and the recording and reproduction can normally be performed immediately after the jump.

In Step S903, when the gain phase characteristic is not the low-gain or narrow-band state (No in Step S903), the gain phase adjustment circuit 811a adjusts the gain and the phase of the tilt error signal in the usual gain phase characteristic to output the tilt error signal to the tilt drive control unit (Step S905).

Because the objective lens drive process in Step S906 is similar to Step S207 in the optical disk recording and reproducing apparatus 100 of the first embodiment, the description will be not repeated.

Thus, in the optical disk recording and reproducing apparatus according to the first embodiment, the gain phase characteristic can be changed during the periods of the inter-layer jump and the track jump so that the gain of the tilt control is decreased, or so that the control band of the tilt control is narrowed. Therefore, the servo run-away and the immediate post-jump destabilization of the recording or reproducing process can be avoided without following the tilt error signal disturbance generated by the jump, and the tilt control can be performed in the broadband not lower than the disk rotation frequency without losing the apparatus operation stability.

Since the tilt control is continued, the recording and the reproduction can be performed more correctly immediately after the jump.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, the connection order of the gain phase adjustment circuit and the S/H circuit or switch circuit may be changed. That is, the same effect is obtained even if the tilt error signal to be held or changed is the pre-gain phase adjustment value or the post-gain phase adjustment value.

It is also possible that the tilt error signal value held during the jump and the initial value of the tilt error signal in resuming the tilt control after the jump are set at different values. For example, although the tilt error signal value of the immediate pre-jump is held during the jump in the first embodiment, it is possible that the tilt control is started in resuming the tilt control while the predetermined reference value (initial control state) different from the holding value is used as the initial value.

An initial tilt storage unit (not shown) may be provided and the tilt error signal may be obtained from the initial tilt storage unit during the resumption to start the tilt control with the tilt error signal value. The initial tilt storage unit has the same data structure as the hold tilt storage unit 513, and a predetermined initial control state is stored in the initial tilt storage unit according to the target data recording layer of jump or the target track of jump. Therefore, the servo run-away can be avoided in the jump and the recording or reproducing process can be performed more appropriately immediately after the jump.

In the embodiments, the single-sided two-layer disk is cited as the disk in which the inter-layer jump is generated during operation. However, the disk structure is not limited to the single-sided two-layer disk. For example, the invention can be applied to the multi-layered disk having at least three layers in the single side. The invention can also be applied to the disk in which the light source wavelengths used for the recording and reproduction differ from one another depending on the data recording layer and the corresponding optical disk recording and reproducing apparatus.

What is claimed is:

1. An optical disk recording and reproducing apparatus, comprising:
    a focus unit that focuses an irradiation light beam on an optical disk having a plurality of data recording layers and a plurality of tracks;
    a drive unit that changes a direction of the irradiation light beam by moving the focus unit;
    a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit holding a control state of the control at an immediate pre-state of an inter-layer jump in which the irradiation light beam is moved to a different data recording layer or a track jump in which the irradiation light beam is moved to a different track during the inter-layer jump or the track jump.

2. The optical disk recording and reproducing apparatus according to claim 1, wherein the tilt control unit starts the control of the drive unit while setting the control state at an initial state after the inter-layer jump or the track jump.

3. The optical disk recording and reproducing apparatus according to claim 1, wherein the tilt control unit starts the control of the drive unit while setting a predetermined initial control state at an initial state after the inter-layer jump or the track jump.

4. The optical disk recording and reproducing apparatus according to claim 3, wherein the tilt control unit sets the control state in which the tilt control unit does not control the drive unit, at the initial control state.

5. The optical disk recording and reproducing apparatus according to claim 3, further comprising an initial tilt storage unit in which the initial control state is stored while associated in each data recording layer of the optical disk or in each track of the optical disk,
    wherein the tilt control unit obtains the initial control state corresponding to the data recording layer from which the control is started or to the track from which the control is started from the initial tilt storage unit.

6. An optical disk recording and reproducing apparatus, comprising:
    a focus unit that focuses an irradiation light beam on an optical disk having a plurality of data recording layers and a plurality of tracks;
    a drive unit that changes a direction of the irradiation light beam by moving the focus unit;
    a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit holding a control state of the control at a predetermined hold control state during an inter-layer jump in which the irradiation light beam is moved to a different data recording layer or a track jump in which the irradiation light beam is moved to a different track.

7. The optical disk recording and reproducing apparatus according to claim 6, wherein the tilt control unit sets the control state in which the tilt control does not control the drive unit, at the hold control state.

8. The optical disk recording and reproducing apparatus according to claim 6, further comprising a hold tilt storage unit in which the hold control state is stored while associated in each data recording layer of the optical disk or in each track of the optical disk,
    wherein the tilt control unit obtains the hold control state corresponding to the data recording layer from which the control is started or to the track from which the control is started from the hold tilt storage unit.

9. The optical disk recording and reproducing apparatus according to claim 6, wherein the tilt control unit starts the control of the drive unit while setting a predetermined initial control state at an initial state after the inter-layer jump or the track jump.

10. The optical disk recording and reproducing apparatus according to claim 9, wherein the tilt compensation control unit sets the control state in which the tilt control unit does not control the drive unit, at the initial control state.

11. The optical disk recording and reproducing apparatus according to claim 9, further comprising
    an initial tilt storage unit in which the initial control state is stored while associated in each data recording layer of the optical disk or in each track of the optical disk,
    wherein the tilt control unit obtains the initial control state corresponding to the data recording layer from which the control is started or to the track from which the control is started from the initial tilt storage unit.

12. An optical disk recording and reproducing apparatus, comprising:
   a focus unit that focuses an irradiation light beam on an optical disk having a plurality of data recording layers and a plurality of tracks;
   a drive unit that changes a direction of the irradiation light beam by moving the focus unit;
   a tilt control unit that detects a tilt amount of the optical disk, computes a control operation amount in a band wider than a rotation frequency of the optical disk based on the tilt amount, and controls the drive unit to move the focus unit based on the control operation amount, the tilt control unit decreasing a control gain of the tilt control unit or narrowing a control band of the tilt control unit during an inter-layer jump in which the irradiation light beam is moved to a different data recording layer or a track jump in which the irradiation light beam is moved to a different track.

13. The optical disk recording and reproducing apparatus according to claim 12, wherein the tilt control unit recovers the control gain or the control band to a pre-start value of the inter-layer jump or the track jump after inter-layer jump or the track jump.

* * * * *